(12) United States Patent
Strande

(10) Patent No.: US 12,332,268 B2
(45) Date of Patent: Jun. 17, 2025

(54) METHOD AND APPARATUS FOR RAPID SEQUENTIAL FLOW INJECTION

(71) Applicant: SARTORIUS BIOANALYTICAL INSTRUMENTS, INC., Bohemia, NY (US)

(72) Inventor: Christopher Iver Strande, Edmond, OK (US)

(73) Assignee: SARTORIUS BIOANALYTICAL INSTRUMENTS, INC., Bohemia, NY (US)

(*) Notice: Subject to any disclaimer, the term of this patent is extended or adjusted under 35 U.S.C. 154(b) by 1332 days.

(21) Appl. No.: 17/002,462

(22) Filed: Aug. 25, 2020

(65) Prior Publication Data

US 2020/0386780 A1 Dec. 10, 2020

Related U.S. Application Data

(62) Division of application No. 15/502,846, filed as application No. PCT/US2015/045098 on Aug. 13, 2015, now Pat. No. 10,788,507.

(Continued)

(51) Int. Cl.
*G01N 35/10* (2006.01)
*G01N 21/11* (2006.01)
(Continued)

(52) U.S. Cl.
CPC ......... *G01N 35/1097* (2013.01); *G01N 21/11* (2013.01); *G01N 21/553* (2013.01);
(Continued)

(58) Field of Classification Search
None
See application file for complete search history.

(56) References Cited

U.S. PATENT DOCUMENTS

| 4,816,226 A | 3/1989 | Jordan et al. |
| 6,008,893 A | 12/1999 | Roos et al. |

(Continued)

FOREIGN PATENT DOCUMENTS

| JP | 2002501622 | 1/2002 |
| WO | 0190295 | 11/2001 |

OTHER PUBLICATIONS

International Search Report and Written Opinion of the International Searching Authority dated Nov. 4, 2015 mailed in related application PCT/US15/045098 Nov. 4, 2015.

(Continued)

*Primary Examiner* — Jennifer Wecker
*Assistant Examiner* — Britney N. Washington
(74) *Attorney, Agent, or Firm* — McAfee & Taft

(57) ABSTRACT

A fluid delivery system and process for fluid delivery is provided that is useful in in flow-injection based sensing measurements, wherein samples from a sample rack are introduced into a flow cell where sensing measurements are taken. The system and process utilize at least two holding lines where each holding line can retain one of the samples prior to injection of the thus retained sample into a flow cell. The introduction of the samples from the sample racks to the holding lines is alternated and the injection of the samples from the holding lines to the flow cell are alternated so that one holding line is loaded with one of the samples simultaneously with another sample being injected from the another holding line to the flow cell.

16 Claims, 6 Drawing Sheets

Related U.S. Application Data

(60) Provisional application No. 62/036,860, filed on Aug. 13, 2014.

(51) Int. Cl.
    *G01N 21/552*     (2014.01)
    *G01N 35/08*     (2006.01)

(52) U.S. Cl.
    CPC ....... *G01N 35/1095* (2013.01); *G01N 35/085* (2013.01); *G01N 2201/128* (2013.01)

(56) References Cited

U.S. PATENT DOCUMENTS

| | | |
|---|---|---|
| 6,175,409 B1 | 1/2001 | Nielsen et al. |
| 6,318,157 B1 | 11/2001 | Corso et al. |
| 6,436,292 B1 | 8/2002 | Petro |
| 8,414,774 B2 | 4/2013 | Lamarr et al. |
| 2002/0020670 A1* | 2/2002 | Petro .................. G01N 30/466 210/656 |
| 2007/0212784 A1 | 9/2007 | Okun |
| 2010/0024527 A1 | 2/2010 | LaMarr et al. |
| 2011/0146389 A1 | 6/2011 | Wiederin |
| 2011/0295512 A1 | 12/2011 | Quinn |
| 2013/0157251 A1 | 6/2013 | Quinn |

OTHER PUBLICATIONS

Chinowsky, Timothy M., et al., "Data Analysis and Calibration for a Bulk-Refractive-Index-Compensated Surface Plasmon Resonance Affinity Sensor", Biomedical Photonics and Optoelectronic Imaging, vol. 4578, pp. 442-453, Feb. 18, 2002.

* cited by examiner

METHOD AND APPARATUS FOR RAPID SEQUENTIAL FLOW INJECTION

CROSS-REFERENCE TO RELATED APPLICATIONS

This application is a divisional of U.S. application Ser. No. 15/502,846 filed Feb. 9, 2017, now allowed, which is a U.S. national stage filing of PCT Application No. PCT/US2015/045098 filed Aug. 13, 2015, which claims the benefit of U.S. Provisional Application No. 62/036,860 filed Aug. 13, 2014, which are all hereby incorporated by reference.

FIELD

The present disclosure relates generally to fluid injecting systems for flow-injection based sensing systems, such as surface plasmon resonance.

BACKGROUND

Flow-injection based sensing systems, such as surface plasmon resonance (SPR), are analytical methods routinely used to examine interaction of molecules, particularly biomolecular interactions, and measurement of molecular association and dissociation rates, affinity constants and other characteristics associated with molecular interaction or binding events. For example, surface plasmon resonance, in its simplest terms, is a technique for detecting changes in refractive index at the surface of a sensor.

Measurements of these interactions are performed by a process herein referred to as flow injection. The instrument is configured in such a way as to present a running buffer to the sensor surface. Using various microfluidic components such as syringe pumps, multiposition valves, an autosampling robot, etc., a compound of interest will be presented to the sensing surface for a period of time—the flow injection. At the conclusion of the injection, flow of running buffer is restored to the sensor surface.

In a typical assay, multiple injections are performed using different compounds of interest in sequential order. The duration of the entire assay is then dependent upon the number of compounds and the duration of the steps performed in one iteration of the assay, an assay cycle. These steps may include various preparatory functions, loading of sample into the instrument, the actual flow injection, sample dissociation time, and any injection cleanup operations. Any reduction in assay duration is advantageous for users of the instrument.

DESCRIPTION OF INVENTION

Figure 1:
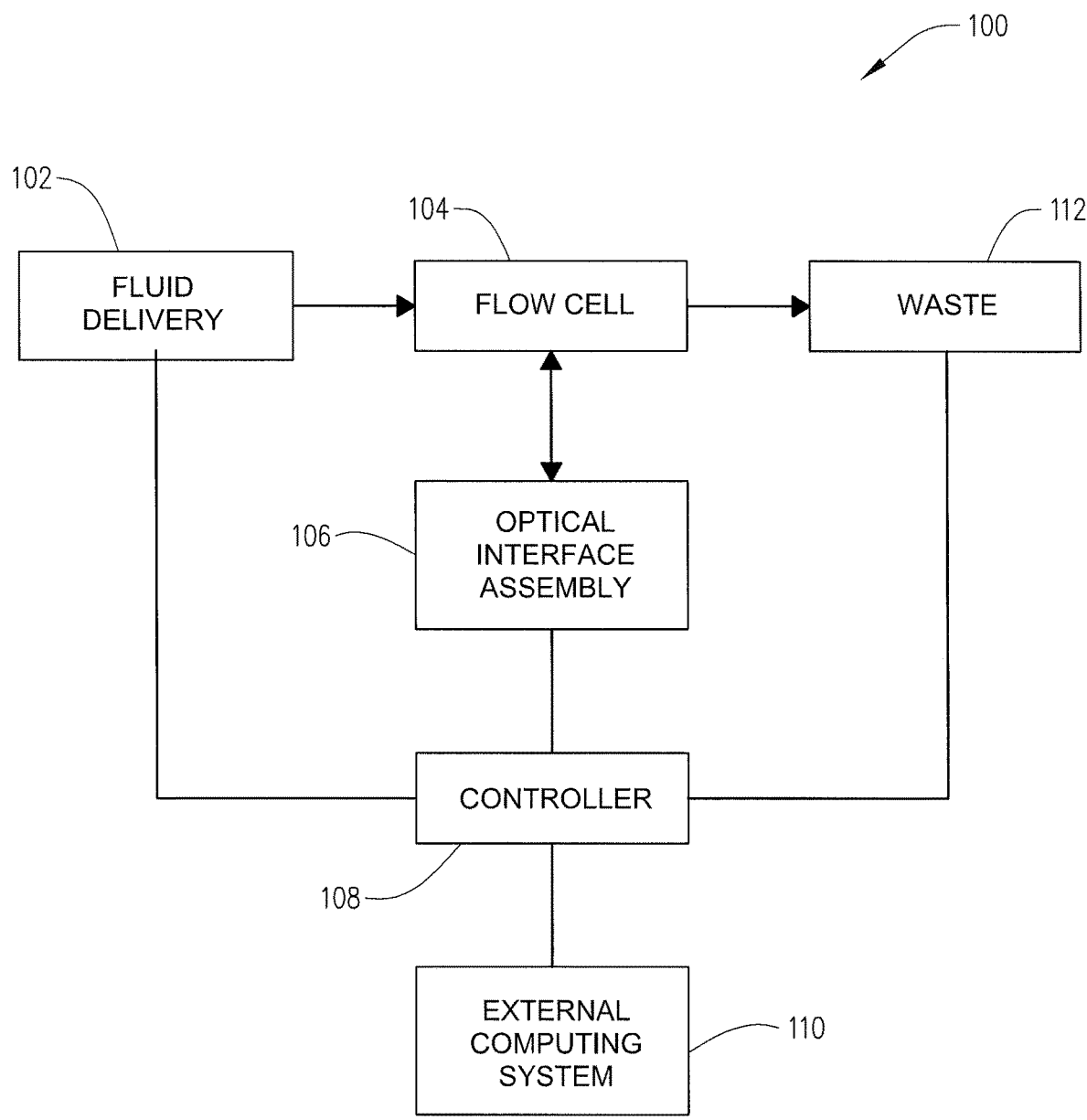
FIG. 1 is a diagram of an SPR test system, which can use the fluid delivery system of some embodiments.

In the description that follows, like parts are marked throughout the specification and drawings with the same reference numerals, respectively. The drawings are not necessarily to scale and the proportions of certain parts have been exaggerated to better illustrate details and features of the invention. The terms "inwardly" and "outwardly" are directions toward and away from, respectively, the geometric axis of a referenced object. Where components of relatively well-known design are employed, their structure and operation will not be described in detail.

A method and apparatus for performing flow injections in rapid sequence is described. The method and apparatus described can be useful in flow-injection based sensing systems in general but will be described in terms of Surface Plasmon Resonance (SPR). In flow-injection based sensing systems, typically biomolecular interaction analysis applications, a sample or analyte is made to flow across a surface sensitive detector through flow injection. The method involves performing certain flow injection steps in parallel so as to reduce the overall run time of an experiment. The invention relates to a method for performing steps simultaneously, thereby reducing the assay cycle time and the overall assay duration.

A typical flow injection system, such as that developed by SensiQ Technologies for the SensiQ® Pioneer instrument, is usually arranged such that the steps to perform an injection are carried out in sequential order. A high-level diagram of these steps is shown below in Table 1 for a series of three injections.

TABLE 1

| Load Sample 1 | Inject Sample 1 | Cleanup Injection 1 | Load Sample 2 | Inject Sample 2 | Cleanup Injection 2 | Load Sample 3 | Inject Sample 3 | Cleanup Injection 3 |
| --- | --- | --- | --- | --- | --- | --- | --- | --- |

The enabling technology of the invention involves an arrangement of the microfluidic components such that some of the required steps can be performed simultaneously when a series of sample injections is desired. A high-level diagram of the same series of three injections using an embodiment of the method of the invention is shown below in Table 2.

TABLE 2

| Load Sample 1 | Inject Sample 1 | Cleanup Injection 1 | Inject Sample 2 | Cleanup Injection 2 | Inject Sample 3 | Cleanup Injection 3 |
| --- | --- | --- | --- | --- | --- | --- |
|  | Load Sample 2 |  | Load Sample 3 |  | Load Sample 4 |  |

Referring now to FIG. 1, a diagram of an SPR testing system 100 is illustrated. A flow injection system or fluid delivery system 102 includes a complex of flow channels, valves, pumps and/or other components configured to provide a substantially constant flow of fluid from a plurality of fluid sources to a flow cell 104. According to embodiments, the flow cell 104 may be operatively coupled to an optical interface assembly 106, which is configured to carry out an SPR measurement. SPR optical interface assemblies are known in the art and may include a thin-film optical substrate, prism, illuminator and detector.

Typically, the flow cell may be configured to maintain an electrooptical relationship between the SPR coupling surface and a plurality of active sensing regions (not shown). The thin-film optical substrate is typically derivatized to possess a coating that enables biomolecules ("ligands") to be immobilized to the substrate. The immobilized biomolecules usually possess binding specificity for one or more particular polypeptides, proteins, polynucleotides, kinases, and/or other small molecules. The areas of specific affinity may be referred to as active sensing regions. The active sensing regions may generally be separated by one or more continuous areas resistant to non-specific binding of one or more of the above. It is common in experimental design to designate one or more active sensing regions as reference sensing regions by not immobilizing a biomolecule to the corresponding region of interrogation on the thin-film optical substrate.

The active sensing regions include binding moieties such as anchored proteins that extend upward from the surface of the thin-film optical substrate into the fluid in and flowing through the flow cell 104. If an analyte flowing through the flow cell includes a particular molecule or biomolecule for which the binding moiety of a particular active sensing region has affinity, the molecule or biomolecule may bind to or associate with the binding moiety according to a characteristic association kinetic. Association of the molecule or biomolecule to the active sensing region changes the index of refraction in a volume near the active sensing region. Typically, the analyte is made to pass through the flow cell as a homogenous volume segment of constant or fixed concentration. However, there are other methods known in the art where the analyte volume segment is made to undergo dispersion with either the buffer solution or a third solution en route to the flow cell in order to present a gradient in analyte concentration to the active sensing regions. See for example, U.S. Patent Publication 2011/0295512 and U.S. Patent Publication 2013/0273564.

If another analyte or buffer solution is then flowed through the flow cell, and the other analyte or buffer does not include the particular molecule or biomolecule, the bound molecule or biomolecule may dissociate from the binding moiety of the active sensing region according to a characteristic dissociation kinetic. The buffer is typically a solution of near neutral pH or a weak acid or weak base, which contains no analyte. Suitable buffers are typically saline solutions containing HEPES, phosphate, TRIS and/or other additives depending on the desired experimental conditions.

Dissociation of the molecule or biomolecule from the active sensing region again changes the index of refraction of the fluid volume near the active sensing region. Generally, complete dissociation may reduce the index of refraction to at or near the starting index of refraction before the initial binding. In some cases, complete dissociation may take a very long time and/or the index of refraction may not quite return to its original value. Moreover, a series of associations and dissociations may result in a gradual change in the index of refraction. When the change becomes too great, the surface of the thin-film optical substrate may need to be conditioned or regenerated to return substantially to its initial state.

In circumstances where the sensing surface needs to be regenerated, regeneration can be performed by flowing a wash fluid, such as water, a detergent, and/or an acid for example, through the flow cell. Such regeneration may generally return the index of refraction near the active sensing region to near its original value. For example, during a regeneration phase, water, a detergent, an acid, or sequential combinations of water, detergent, and acid may be injected into the flow cell to remove the last tenacious bits of the molecule or biomolecule that remain adhered to the active sensing region after conclusion of the dissociation.

An optical interface assembly 106 is operable to illuminate the thin-film optical substrate and detect variations in the amount of reflected light energy. The amount of reflected light energy is, in turn, affected by binding (or not) of a molecule or biomolecule from an analyte onto the active sensing regions.

As discussed above, the optical interface assembly 106 typically includes an illuminator configured to illuminate the thin-film optical substrate. The illuminator may include a number of discrete and/or integrated components operative to produce the illumination. Typically, a prism is aligned to receive light from the illuminator and couple it to the thin-film optical substrate. A portion of the photons of light may be converted to surface plasmons. In some SPR systems, the remaining photons are reflected from the thin-film optical substrate, and the prism is configured to couple them out to a detector. The detector is operable to detect variations in the proportion of photons reflected from across the surface of the thin-film optical substrate, the variations typically include a component related to the association and dissociation of molecular and/or biomolecular moieties from the analyte onto one or more of the active sensing regions. Typically, higher loading (i.e., a greater proportion of binding moiety active sites being associated with the specific molecule or biomolecule) tends to increase the conversion of photons to surface plasmons (and hence reduce the number of reflected photons), and lower loading tends to minimize the conversion of photons to surface plasmons (and hence maximize the number of reflected photons).

Other SPR systems detect a shift in the emission angle of the plasmons by tracking the SPR dip minimum. Higher loadings of analyte results in increasing the angle at which emission occurs.

A controller 108 may be operatively coupled to the fluid delivery system 102 and optical interface assembly 106, and may include an interface to an external computing system or network 110. Alternatively, the interface to the external computing system or network 110 may be omitted and the apparatus 100 may operate as a stand-alone system. Controller 108 may be used to control the output of the illuminator, perform image processing on the image acquired by the detector, perform data analysis or transmit image data to an external processor 110 for image processing, transmit and receive status and command data to and from internal components and external systems, provide a human interface via a keyboard, display, and/or other status indicators (not shown), and control the fluid delivery system 102. In particular, the fluid delivery system may include pumps and valves with electrical control interfaces, and the controller 108 may transmit signals to operate the pumps, valves, etc. of the fluid delivery system 102. As necessary, the controller 108 may be operatively coupled to waste system 112.

Figure 2:
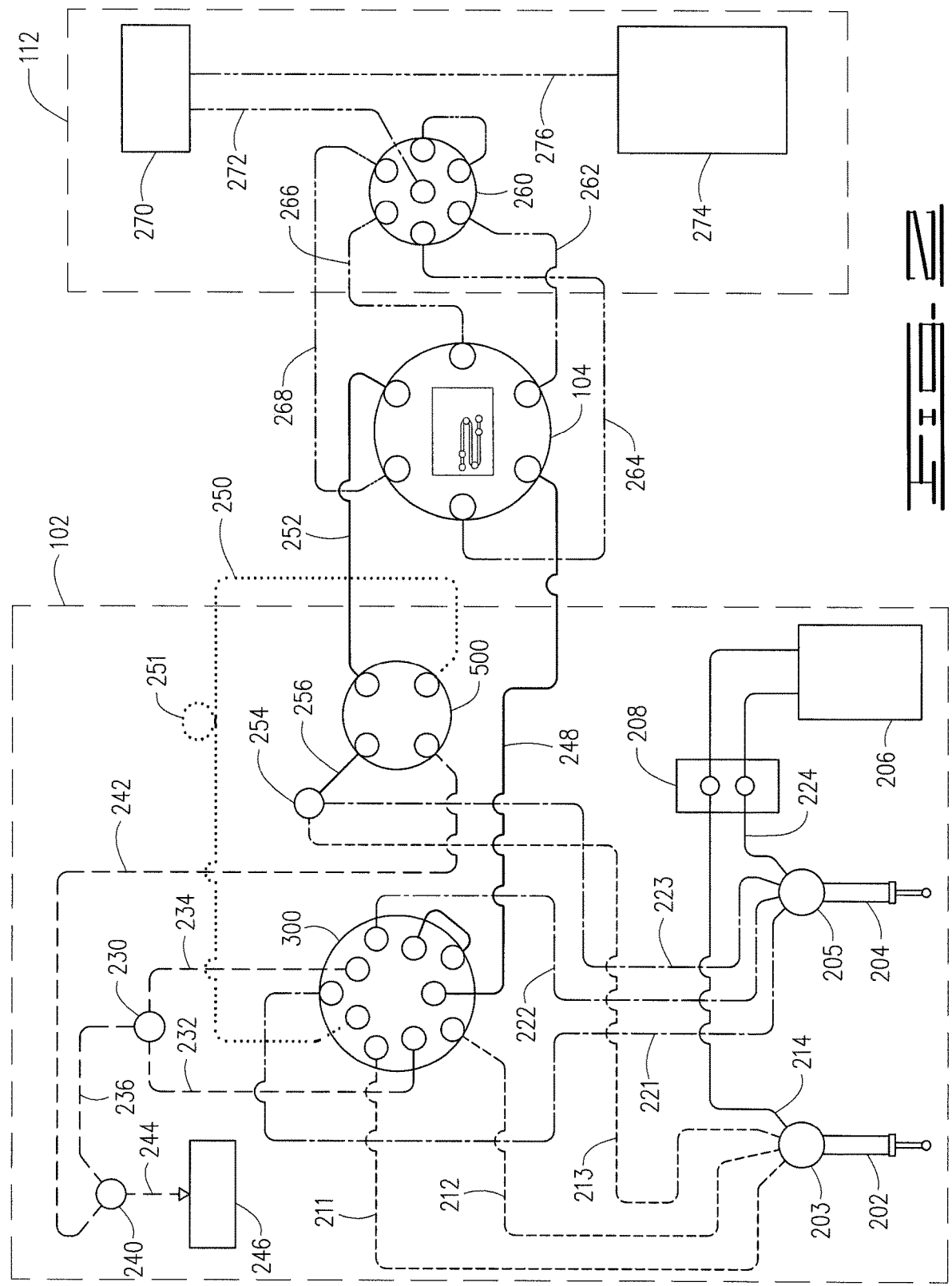
FIG. 2 is a fluidic schematic illustrating a fluid delivery system according to some embodiments.

FIG. 2 is a schematic diagram of a fluid delivery system 102, a flow cell 104 and waste system 112 according to some embodiments. The fluid delivery system 102 includes a first pump 202, and a second pump 204 configured to pump fluids through the flow cell 104 via first multi-port valve 300 and second multi-port valve 500. The first and second pumps 202, 204 may each be a pump such as a syringe pump, such as the Cavro XLP6000 syringe pump or Cavro Centris syringe pump marketed by Tecan. Each pump 202, 204 has a distribution valve 203, 205 so as to be configured to pump to or from one of four flow lines. Generally, the distribution valve 203 can be set for first pump 202 to pump buffer solution into the pump's syringe from buffer storage 206 through flow line 214 and out through one of flow lines 211, 212 and 213. Accordingly, distribution valve 203 is configured such that one port of first multi-port valve 300 or second multi-port valve 500 receives fluid from pump 202 at any time. The buffer solution from buffer storage 206 can pass through a degasser 208 prior to being introduced into first pump 202.

Similarly, distribution valve 205 typical can be set for second pump 204 to pump buffer solution into the pump's syringe from buffer storage 206 through flow line 224 and out through one of flow lines 221, 222, 223. Accordingly, distribution valve 205 is configured such that one port of first multi-port valve 300 or second multi-port valve 500 receives fluid from pump 204 at any time. Again, buffer solution from buffer storage 206 can pass through a degasser 208 prior to being introduced into second pump 204. Any suitable distribution valve can be utilized for distribution valve 203, 205.

Flow lines 211 and 212 connect first pump 202 in fluid flow communication to first multi-port valve 300. Flow lines 221 and 222 connect second pump 204 in fluid flow communication to first multi-port valve 300. Additionally, first multi-port valve 300 is connected to a junction 230 via flow lines 232 and 234. Junction 230 is also connected to flow line 236, which places junction 230 in fluid flow communication with junction 240. Junction 240 is operably connected to probe 244, which can obtain samples from sample rack 246 or can be placed in fluid flow communication with wash station 270. Additionally, junction 240 is in fluid flow communication with second multi-port valve 500 via flow line 242. Thus, fluid flow across junction 240 is either between probe 244 and second multi-port valve 500 via flow line 242 or is between probe 244 and junction 230 via flow line 236, depending on the pump 202, 204 in operation and its associated distribution valve setting. In turn, fluid flow across junction 230 is between probe 244 and first multi-port valve 300 either by flow line 232 or by flow line 234, depending on the pump 202, 204 in operation and its associated distribution valve setting. Accordingly, first multi-port valve 300 can receive fluid, typically samples, from probe 244 either through flow line 232 or through flow line 234. Additionally, probe 244 can receive fluid, typically buffer solution, from first multi-port valve 300 through either flow line 232 or through flow line 234. Finally, first multi-port valve 300 is in fluid flow communication with flow cell 104 via line 248, which places it in communication with waste selector 260.

Flow line 213 connects first pump 202 in fluid flow communication with junction 254, which is in fluid flow communication with second multi-port valve 500 via flow line 256. Similarly, flow line 223 connects second pump 202 in fluid flow communication with junction 254; hence, to second multi-port valve 500 via flow line 256. Thus, fluid flow across junction 254 is either between first pump 202 and second multi-port valve 500 via flow lines 213 and 256 or is between second pump 204 and second multi-port valve 500 via flow lines 223 and 256, or both pumps 202, 204 depending on which pump(s) is in operation and its associated valve setting.

As mentioned above, second multi-port valve 500 can be in fluid flow communication with probe 244 via flow line 242. Additionally, second multi-port valve 500 is in fluid flow communication with first multi-port valve 300 via flow line 250 and with flow cell 104 via flow line 252. Flow line 250 can include dispersion loop 251. Embodiments that do not include dispersion loop 251 will produce substantially constant concentration analyte injections. Embodiments that do include dispersion loop 251 will produce analyte gradient concentration injections. Fluids entering flow cell 104 through flow line 252 interact with the thin-film optical substrate of the optical interface assembly 106. It should be noted that fluids entering flow cell 104 through flow line 248 can also interact with the optical interface depending on the selection of the waste port.

Flow cell 104 is connected in fluid flow communication with waste selector 260 via flow lines 262, 264, 266 and 268. Hence, fluid entering through flow line 248 or flow line 252 is delivered to waste selector 260. Waste selector 260 is in turn in fluid flow communication with wash station 270 via flow line 272. Wash station 270 is also in fluid flow communication with waste storage 274 via flow line 276.

Figure 3:
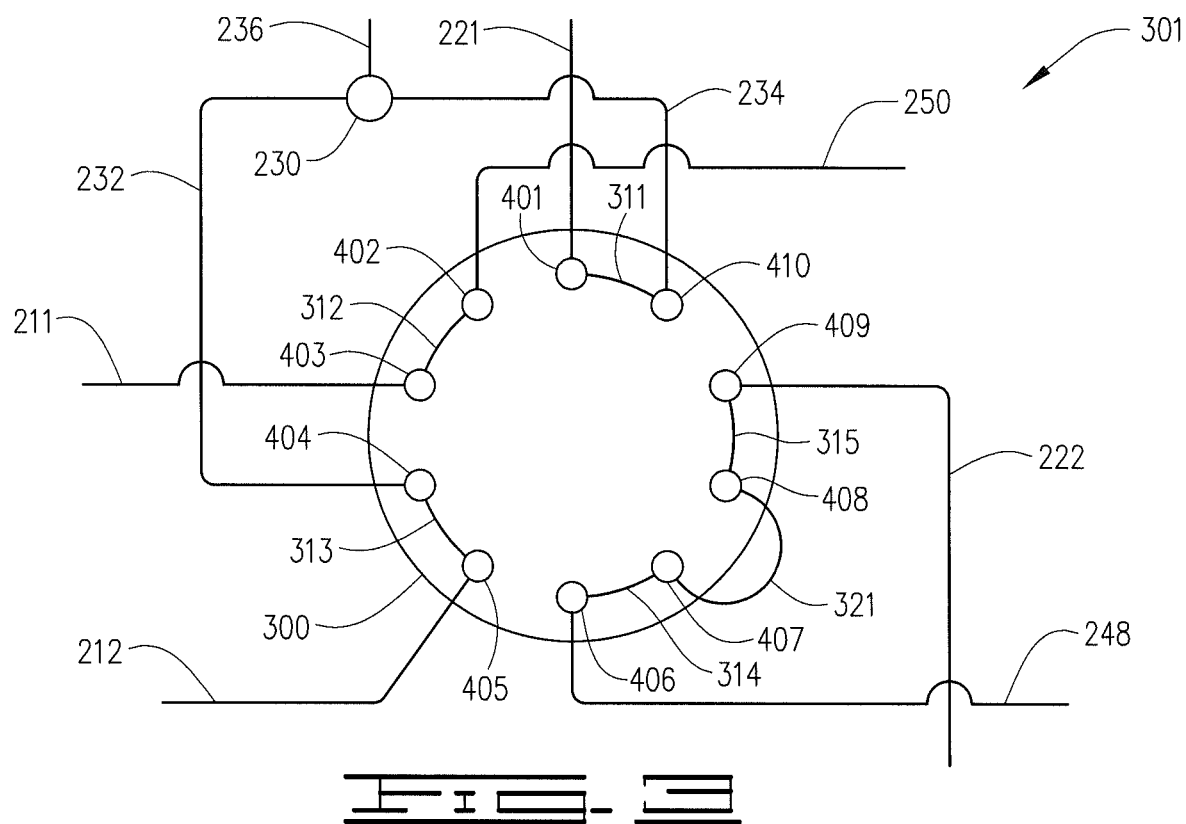
FIG. 3 is a schematic diagram of a first position of the ten-port valve used in FIG. 2

According to one embodiment, first multi-port valve 300 can be a two-position, ten-port valve as shown or can be a two-position, eight-port valve; thus eliminating jumper flow line 321 described below. FIG. 3 is a diagram of first multi-port valve 300 in a position A or first position 301. The valve position 301 couples five pairs of ports. Port 401 is coupled via a flow channel 311 to port 410; port 402 is coupled via a flow channel 312 to port 403; port 404 is coupled via a flow channel 313 to port 405; port 406 is coupled via a flow channel 314 to port 407; and port 408 is coupled via a flow channel 315 to port 409. Additionally, port 408 is coupled to port 407 via a flow line 321. In abbreviated form, the following ports are linked in the first position 301: 401-410, 402-403, 404-405, 406-407, 408-409.

In first position 301, a fluid in flow line 211, which acts as a holding line, can be pushed by first pump 202 through the first multi-port valve 300. The fluid enters at port 403 and exits at port 402. The fluid is then pushed to second multi-port valve 500 via flow line 250. Additionally, a fluid can be pulled into flow line 221, which acts as a holding line, by second pump 204. The fluid is pulled into probe 244 and through flow line 236 and 234 to enter first multi-port valve 300 via port 410 and exit via port 401. From port 401, the fluid is introduced into holding line 221. For example, the fluids may include analytes. Additionally, buffer fluid can be pushed through first multi-port valve 300, as further described below.

Figure 4:
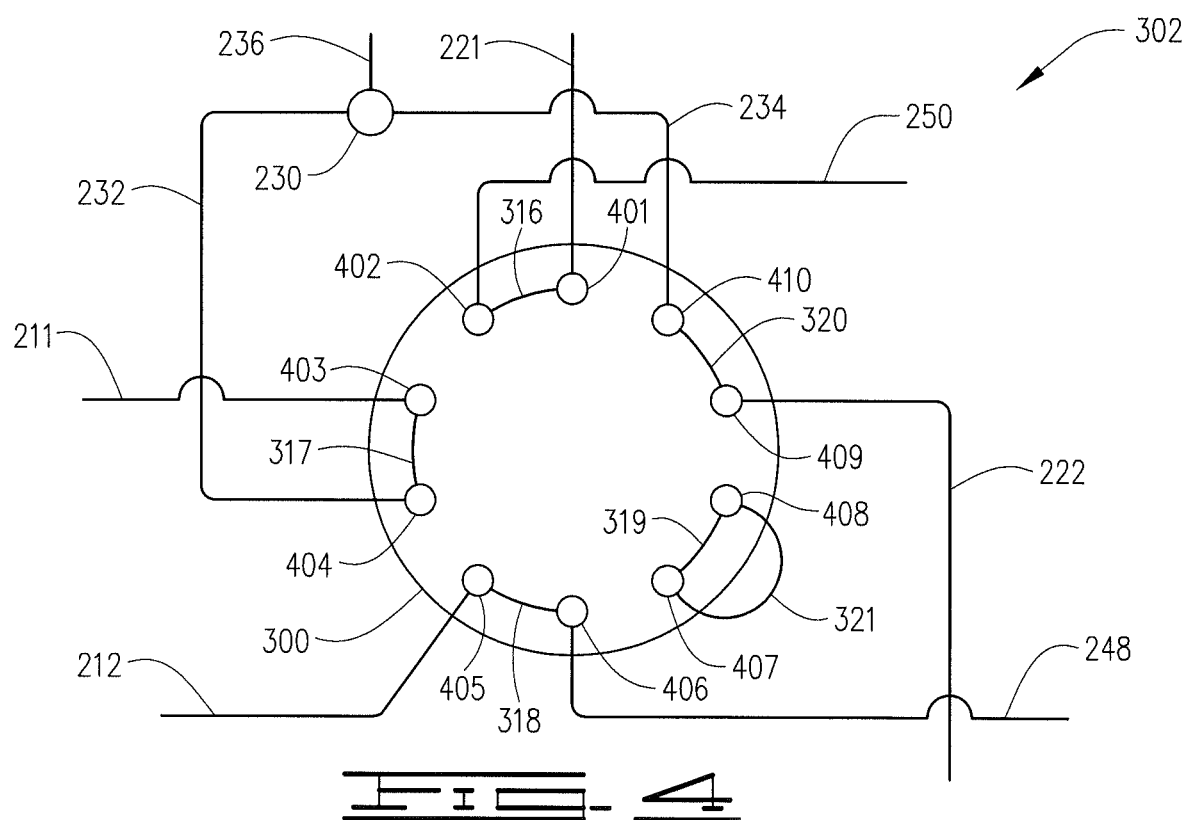
FIG. 4 is a schematic diagram of a second position of the ten-port valve used in FIG. 2.

FIG. 4 is a diagram of first multi-port valve 300 in a position B or second position 302. The valve position 302 couples five pairs of ports. Port 401 is coupled via a flow channel 316 to port 402; port 403 is coupled via a flow channel 317 to port 404; port 405 is coupled via a flow channel 318 to port 406; port 407 is coupled via a flow channel 319 to port 408; and port 409 is coupled via a flow channel 320 to port 410. As in first position 301, port 408 is coupled to port 407 via a flow line 321. In abbreviated form, the following ports are linked in second position 302: 401-402, 403-404, 405-406, 407-408, 409-410.

In second position 302, a fluid in holding line 221 can be pushed by second pump 204 through the first multi-port valve 300. The fluid enters at port 401 and exits at port 402. The fluid is then pushed to second multi-port valve 500 via flow line 250. Additionally, a fluid can be pulled into holding line 211 by first pump 202. The fluid is pulled into probe 244 and through flow line 236 and 232 to enter first multi-port valve 300 via port 404 and exit via port 403. From port 403, the fluid is introduced into holding line 211. For example, the fluids may include analytes. Additionally, buffer fluid can be pushed through first multi-port valve 300, as further described below.

In the above, multi-port valve 330 is described as having ten channels; however, other configurations will be readily apparent, such as the valve can operate so that one channel serves for two different positions. For example, the valve can be built such that the flow channels are five slots on a rotating head, and a motor rotates the head between two positions. Accordingly, there would only be five channels with each channel having a first position connecting a first and a second port, and a second position connection the second port and a third port.

Figure 5:
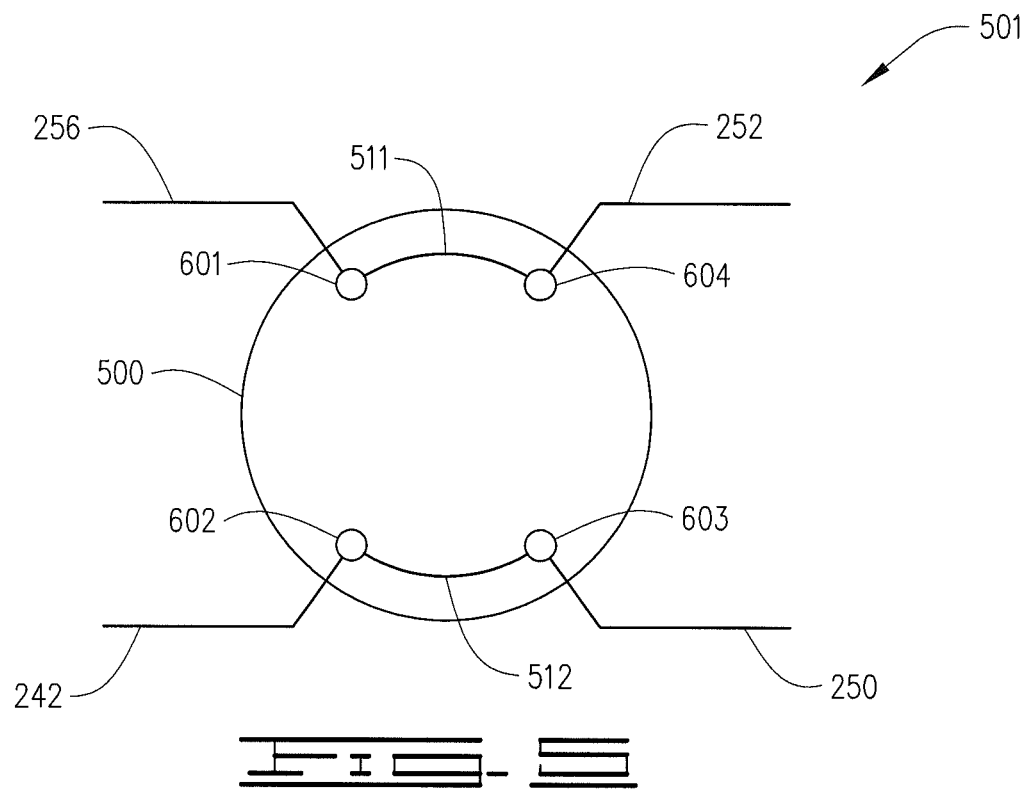
FIG. 5 is a schematic diagram of a first position of the four-port valve used in FIG. 2.
Figure 6:
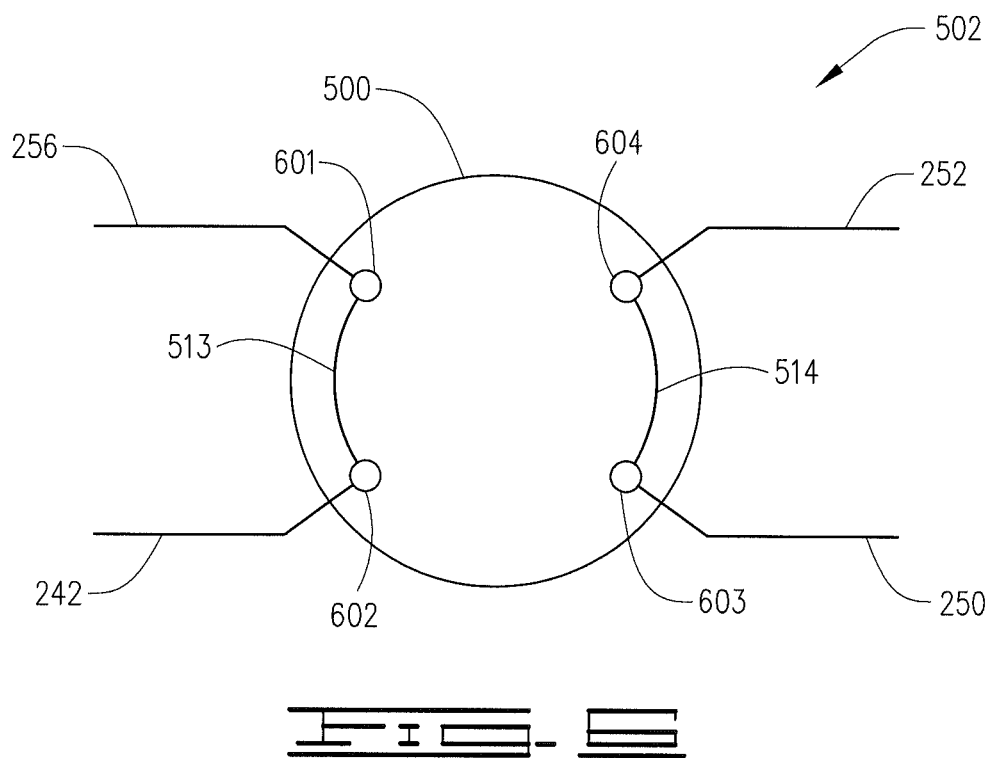
FIG. 6 is a schematic diagram of a second position of the four-port valve used in FIG. 2.

According to some embodiments, second multi-port valve 500 can be a two-position, four-port valve as shown. FIG. 5 is a diagram of second multi-port valve 500 in a position A or first position 501. The valve position 501 couples two pairs of ports. Port 601 is coupled via a flow channel 511 to port 604; and port 602 is coupled via a flow channel 512 to port 603. In abbreviated form, the following ports are linked in first position 501: 601-604, 602-603.

In first position 501, a buffer fluid introduced into flow line 213 or flow line 223 can be pushed by first pump 202 or second pump 204, respectively, through flow line 256 and into second multi-port valve 500. The fluid enters at port 601 and exits at port 604 to be introduced into flow cell 104 via flow line 252. The fluid can then be pushed to waste system 112. Typically, the fluid will be a buffer fluid for cleaning and for dissociation in flow cell 104.

FIG. 5 is a diagram of second multi-port valve 500 in a position B or second position 502. The valve position 502 couples two pairs of ports. Port 601 is coupled via a flow channel 513 to port 602; and port 603 is coupled via a flow channel 514 to port 604. In abbreviated form, the following ports are linked in second position 502: 601-602, 603-604.

In second position 502, a fluid in holding line 211 or holding line 221, which has been pushed into flow line 256, can be pushed by first pump 202 or second pump 204, respectively, through the second multi-port valve 500. The fluid enters at port 603 and exits at port 604 to be introduced into flow cell 104 via flow line 252. Typically, the fluid will be a sample or analyte.

As per multi-port valve 300, multi-port valve 500 can have different configurations such that there are less than the described four channels. The exact configuration of the multi-port valve 300, 500 does not matter as long as they each have a first position and second position in which the flow lines are connected in fluid flow communication as described above.

A process for performing high-throughput sequential injections in accordance with some embodiments will now be described. For the description below, fluid delivery system 102 will have an initial state with the first multi-port valve 300 and the second multi-port valve 500 being both being in their first position. Additionally, holding line 211 will receive the initial sample in the description below. It should be understood the process can start with the multi-port valve in other positions. Additionally, either holding line 211 or 221 can receive the initial sample.

For the initial sample or analyte, first multi-port valve 300 is placed in its second position 302, also known as position B. Pump 202 is driven with distribution valve 203 set so that pump 202 pulls fluid from holding line 21. This pull is transferred down the flow path such that the sample is taken from sample racks 246 into probe 244 and pulled through flow lines 236 and 232. The sample enters first multi-port valve 300 through port 404 and is pulled through the valve to exit port 403; thus, pump 202 loads the sample into holding line 211.

Next, first multi-valve 300 is placed in its first position, also known as position A. At this time, buffer flow can be provided by pump 204 into the flow cell by setting distribution valve 205 so that buffer is pumped into flow line 223. Flow line 223 introduces the buffer solution into second multi-port valve 500 through port 601. Second multi-port valve 500 is in its first position 501, also known as position A; thus, port 601 is in fluid flow communication with port 604. Buffer solution from port 604 enters flow line 252 and is introduced into flow cell 104; thus, preparing it for receiving the sample. Fluid from flow cell 104 will be introduced to waste system 102 through waste selector 260.

Continuing with first multi-valve 300 in its first position 301 and placing second multi-port valve in its second position 502, distribution valve 203 is set for fluid flow to holding line 211. Thus, pump 202 pushes the sample in holding line 211 into second multi-port valve 300 through port 403 and out through port 402. Thus, the sample enters flow line 250 and flows into port 603 of second multi-port valve 500. Subsequently, the sample flows out of port 604 into flow line 252 and is thus introduced into flow cell 104.

During the flow injection, buffer flow is not required from pump 204. Thus, with first multi-valve 300 being in its first position 301, pump 204 can load a sample for subsequent injection into flow cell 104. Pump 204 draws the sample from sample racks 246 into probe 244 and then into flow line 236. The sample in flow line 236 enters port 410 of first multi-port valve 300 via flow line 236 and exits through port 401 into holding line 221. By this procedure, one sample is sent from holding line 211 to flow cell 104 simultaneously with another sample being loaded from the sample racks 246 into holding line 221.

Following the introduction of the sample from holding line 211 into flow cell 104, the injection paths can be cleaned. With the second multi-port valve 500 in its first position 501, buffer solution can be pumped from buffer storage 206 through flow line 224 and into flow line 223 by pump 204. The buffer in flow line 223 then goes through junction 254 to enter port 601 of second multi-port valve 500 via flow line 256. The buffer exits port 604 and enters flow line 252 and subsequently, flow cell 104. Buffer from flow cell 104 is introduced into the waste system 112. Additionally, with first multi-port valve 300 still in its first position 301 and second multi-port valve 500 in its first position 501, pump 202 can wash buffer through the path of flow line 211 into port 403 of first multi-port valve 300, out port 402, into flow line 250, into port 603 of second multi-port valve 500, out port 602 to be introduced into flow line 242, and then into probe 244, which is placed in fluid flow contact with wash station 270 for the cleanout. Also in this position, pump 202 can wash buffer through the path of flow line 212 into port 405 of first multi-port valve 300, out port 404, into flow line 232, into flow line 236 to be introduced into probe 244, which again is in fluid flow contact with wash station 270 for cleanout.

Upon completion of the cleanout, the injection of the sample in holding line 221 can begin immediately because the sample has already been loaded into holding line 221. For the second injection, the roles of pump 202 and pump 204 are reversed. First multi-port valve 300 is placed in its second position 302, and second multi-port valve 500 is placed in its second position 502. Pump 204 will then perform the sample injection by pushing the sample from holding line 221 into port 401 of first multi-port valve 300. The sample can pass through to port 402 into flow line 250 and be introduced into port 603 of second multi-port valve 500. The sample will exit through port 604 and be introduced to the flow cell via flow line 252.

During the flow injection, buffer flow is not required from pump 202. Thus, with first multi-valve 300 being in its second position 302, pump 202 can load a sample for subsequent injection into flow cell 104. Pump 202 draws the sample from sample racks 246 into probe 244 and then into flow line 236. The sample in flow line 236 enters port 404 of first multi-port valve 300 via flow line 232 and exits through port 403 into holding line 211. As will be understood, distribution valve 203 is set for pump 202 to pump into flow lines 211. By this procedure, one sample is sent from holding line 221 to flow cell 104 simultaneously with another sample being loaded from the sample racks 246 into holding line 211.

Following the introduction of the sample from holding line 221 into flow cell 104, the injection paths can be cleaned. With second multi-port valve 500 in its first position 501, buffer solution can be pumped from buffer storage 206 through flow line 214 and into flow line 213 by pump 202. The buffer in flow line 213 then goes through junction 254 to enter port 601 of second multi-port valve 500 via flow line 256. The buffer exits port 604 and enters flow line 252 and subsequently flow cell 104. Buffer from flow cell 104 is introduced into the waste system 112. Additionally, with first multi-port valve 300 still in its second position 301 and second multi-port valve 500 in its first position 501, pump 204 can wash buffer through the path of flow line 221 into port 401 of first multi-port valve 300, out port 402, into flow line 250, into port 603 of second multi-port valve 500, out port 602 to be introduced into flow line 242, and then into probe 244, which is placed in fluid flow contact with wash station 270 for the cleanout. Also in this position, pump 204 can wash buffer through the path of flow line 222 into port 409 of first multi-port valve 300, out port 410, into flow line 234, into flow line 236 to be introduced into probe 244, which again is in fluid flow contact with wash station 270 for cleanout.

The fluid delivery system 102 is now ready to inject the sample in holding line 211 and load another sample in holding line 221. Thus, the sequence may continue for as many sample injections desired with each sample being injected into flow cell 104 from one of the holding lines 211, 221 simultaneously with loading of another sample into the other holding line.

The above embodiments are described with samples being introduced to flow cell 104 through flow line 251. In such embodiments, flow lines 211, 221 serve as holding lines for the sample and the samples go through dispersion loop 251 so as to have a gradient injection of the samples. In some applications, it may be desired to have a fixed concentration injection for the sample. In such cases, flow lines 212, 222 serve as holding lines. Samples from holding line 212 enter multi-port valve 300 through port 405 and exit through port 406 so as to enter flow cell 104 through flow line 248 and interact with the optical interface. Similarly, samples from holding line 222 enter multi-port valve 300 through port 409 and exit through port 406 so as to enter flow cell 104 through flow line 248 and interact with the optical interface. For this fixed concentration application, additionally, adjustments to the flow of buffer for cleaning will be apparent to one skilled in the art from the above description.

EXAMPLES

Figure 7:
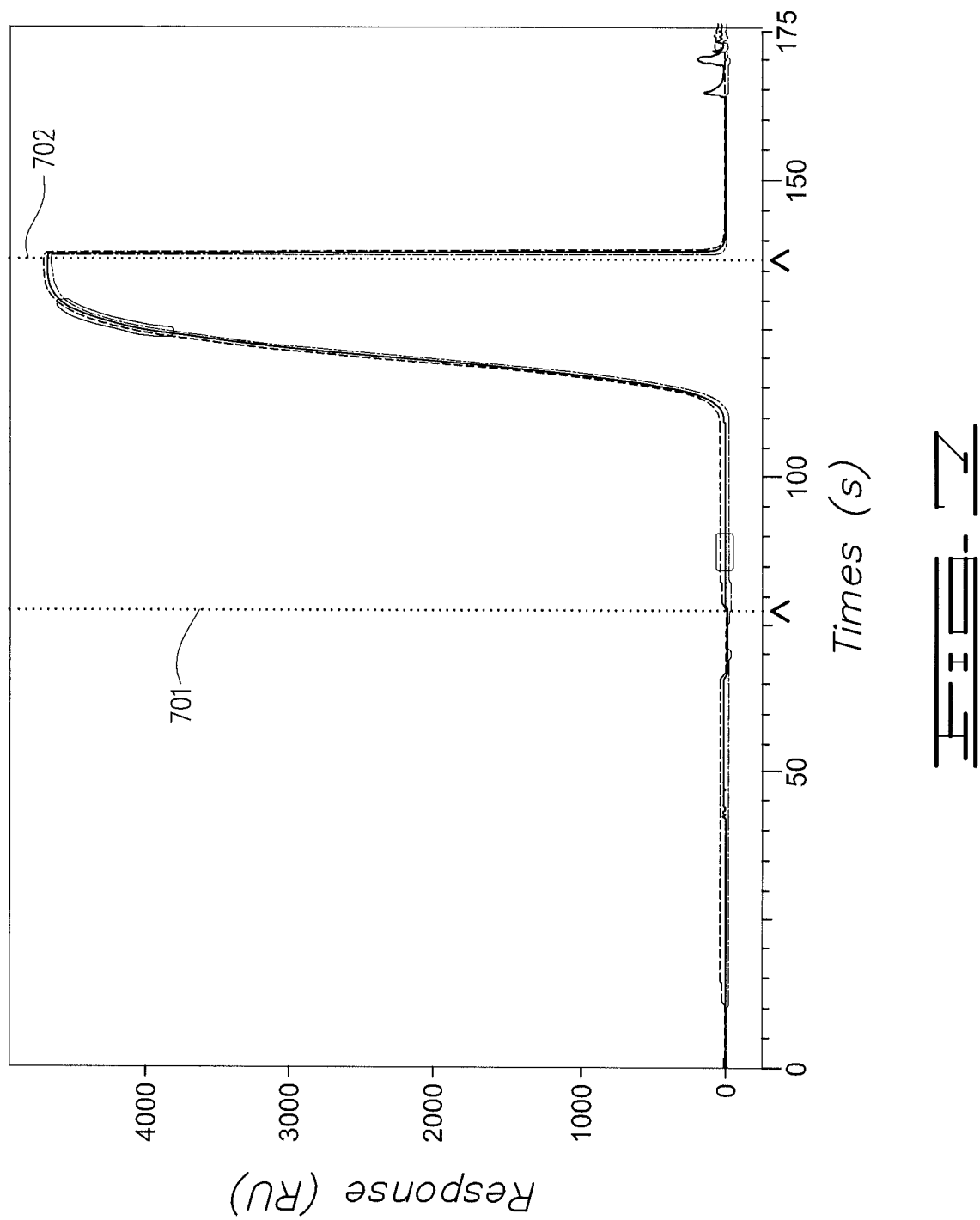
FIG. 7 is a graph illustrating the lead-in time for a first injection of a sample using an embodiment of the current fluid delivery system.

The high-throughput architecture described above was implemented in a test system. The first cycle of an assay is shown in FIG. 7. The injection is the interval of time from line 701 to line 702. The lead-in time is the time required for loading a sample and is the period prior to the injection. In FIG. 7, the lead-in time is the time up to line 701; that is, the time to the left of line 701. In this case, the injection began after approximately 77 seconds.

Figure 8:
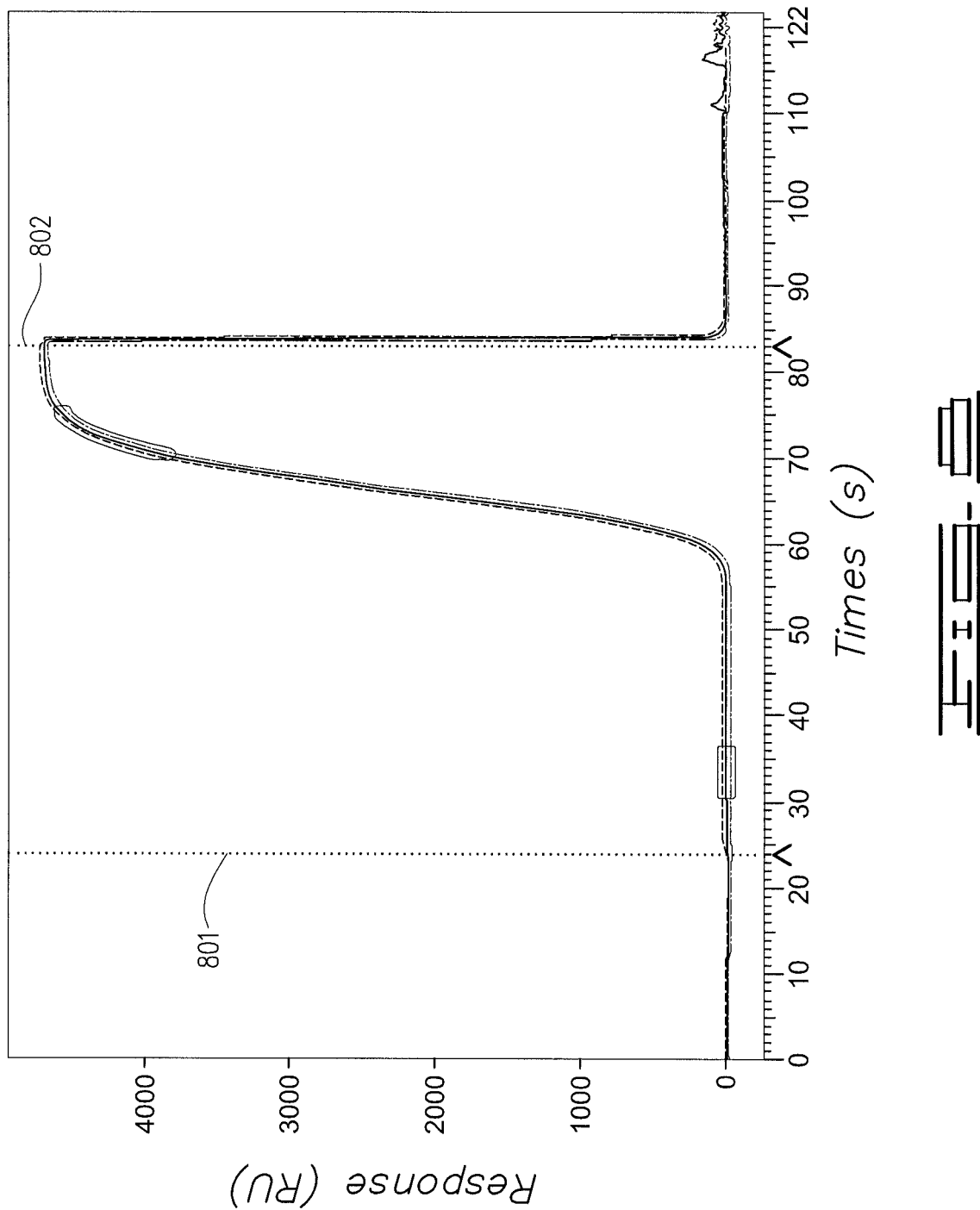
FIG. 8 is a graph illustrating the lead-in time for a second injection of a sample using an embodiment of the current fluid delivery system.

The second cycle of the assay is shown in FIG. 8. The injection interval is the time from line 801 to line 802. As illustrated in FIG. 8, the lead-in time prior to the sample injection has been reduced over that required in FIG. 7. The lead-in time was reduced to approximately 24 seconds. The overall cycle duration was reduced from 175 seconds to 122 seconds, a reduction of 30%.

As a calculated example, consider an assay requiring 2000 sample injections. Using the above cycle times, an assay that does not use the high-throughput method of the current disclosure will have a duration of 97.2 hours. Using the high-throughput method of the current disclosure, the same assay will have a duration of 67.8 hours, saving over one full day.

In accordance with the above description, several embodiments will now be described. In a first embodiment, a process for making fluid delivery in flow-injection based sensing measurements is provided. In the process, samples are introduced into a flow cell where sensing measurements are taken. The process comprises the steps of:
(a) loading a first sample into a first holding line;
(b) injecting the first sample from the first holding line into the flow cell;
(c) loading a second sample into a second holding line, wherein said second sample is loaded simultaneously with step (b);
(d) injecting said second sample from the second holding line into the flow cell; and
(e) loading a third sample into the first holding line, wherein the third sample is loaded simultaneously with step (d).

The process can further comprise continuing the loading and the injecting of samples by alternatively loading samples into the first holding line and second holding line and by simultaneously loading one sample while the other sample is being injected into the flow cell.

Further, the process can include injecting a buffer fluid into the flow cell between injecting samples into the flow cell. Also, the process can include injecting the buffer fluid into the first holding line between the loadings of samples into the first holding line, and injecting the buffer fluid into the second holding line between the loadings of samples into the second holding line.

In some embodiments, the loading of the samples into the first holding line and the second holding line is through a first multiport valve and the injecting of the samples to the flow cell is through the first multiport valve and a second multiport valve. The second multiport valve can have a first position and a second position. When the second multiport valve is in the first position, a buffer solution can be introduced into the flow cell. When the second multiport valve is in the second position, one of the samples from the first holding line or the second holding line can be introduced through the first multiport valve and the second multiport valve.

In further embodiments, the samples pass through a dispersion loop situated between the first multiport valve and the second multiport valve, and the dispersion loop forms a gradient in concentration of the sample prior to injection of the sample to the flow cell.

In other embodiments, a process for fluid delivery in flow-injection based sensing measurements is provided. In the process, samples from a sample rack are introduced into a flow cell where sensing measurements are taken. The process comprises the flowing steps:
(a) providing at least two holding lines where each holding line can retain one of the samples prior to injection of the thus retained sample into a flow cell;
(b) alternating between the holding lines the introduction of the samples from the sample racks to the holding lines; and
(c) alternating the injection of the samples from the holding lines to the flow cell, wherein one holding line is loaded with one of the samples simultaneously with another sample being injected from the another holding line to the flow cell.

In some embodiments, the process, further comprises:
extracting the samples from the sample racks by a probe;
introducing the samples from the probe to the holding lines through a first multiport valve; and
introducing the samples from the holding line to the flow cell through the first multiport valve and a second multiport valve.

In other embodiments, there are no more than two holding lines. The first multiport valve has a first position and a second position. When the first multiport valve is in the first position, a first holding line is in fluid flow communication with the second multiport valve and a second holding line is in fluid flow communication with the probe. When the first multiport valve is in the second position, the first holding line is in fluid flow communication with the probe and the second holding line is in fluid flow communication with the second multiport valve. The second multiport valve has a first position and a second position. When the second multiport valve is in the first position, a buffer solution can be introduced into the flow cell. When the second multiport valve is in the second position, one of the samples from one of the holding lines can be introduced from the first multiport valve to the flow cell through the second multiport valve. Further in these embodiments, the process can have the following steps:
(i) placing the first multiport valve in the second position;
(ii) introducing one of the samples from the sample racks to the first holding line through the probe and the first multiport valve;
(iii) placing the first multiport valve in the first position and the second multiport valve in the second position;
(iv) after step (iii) introducing the sample from the first holding line to the flow cell through the first multiport valve and the second multiport valve while simultaneously introducing another of the samples from the sample racks to the second holding line through the probe and the first multiport valve;
(v) placing the second multiport valve in the first position;
(vi) subsequent to step (iv), introducing the buffer solution from the buffer storage to the wash station through the first multiport valve and the probe;
(vii) subsequent to step (v), introducing the buffer solution from the buffer storage to a wash station through the second multiport valve and the flow cell;
(viii) subsequent to step (vii), placing the first multiport valve in the second position and the second multiport valve in the second position;
(ix) subsequent to step (viii), introducing the sample from the second holding line to the flow cell through the first multiport valve and the second multiport valve while simultaneously introducing another of the samples from the sample racks to the first holding line through the probe and the first multiport valve;
(x) placing the second multiport valve in the first position;
(xi) subsequent to step (ix), introducing the buffer solution from the buffer storage to the wash station through the first multiport valve and the probe; and
(xii) subsequent to step (x), introducing the buffer solution from the buffer storage to a wash station through the second multiport valve and the flow cell.

Additionally, the process can comprise repeating steps (i) through (xii) until a predetermined number of the samples in the sample racks have been introduced into the flow cell.

In still another embodiment, there is provided a fluid delivery system for an apparatus for making flow-injection based sensing measurements. The fluid delivery system comprises a flow cell, a first holding line, a second holding line, a probe, a first multi-port valve and a second multi-port valve. Sensing measurements can be taken from the flow cell. The probe is configured such that a plurality of samples can be introduced into the fluid delivery system through the probe. The first multi-port valve has a first position and a second position. The first multi-port valve is in fluid flow communication with the probe, the first holding line, and the second holding line. The second multi-port valve has a first position and a second position. The second multi-port valve is in fluid flow communication with the first multi-port valve and the flow cell. When the first multi-port valve is in the first position and the second multi-port valve is in the second position, one of the samples can be introduced from the first holding line to the flow cell simultaneously with another of the samples being introduced from the probe to the second holding line. When the first multi-port valve is in the second position and the second multi-port valve is in the second position, one of the samples can be introduced from the second holding line to the flow cell simultaneously with another of the samples being introduced from the probe to the first holding line.

The fluid delivery system can further comprise a buffer storage, a first buffer line and a second buffer line. The first buffer line is in fluid flow communication with the buffer storage and the second multi-port valve such that the second valve can receive buffer solution from the first buffer line and, when the second valve is in the first position, the second valve can introduce the buffer solution to the flow cell and, when the second valve is in the second position, the second valve can introduce buffer solution to the probe.

The second buffer line is in fluid flow communication with the buffer storage and the second multi-port valve such that the second valve can receive buffer solution from the second buffer line and, when the second valve is in the first position, the second valve can introduce the buffer solution to the flow cell and, when the second valve is in the second position, the second valve can introduce buffer solution to the probe.

Additionally, the fluid delivery system can comprise a first pump and a second pump. The first pump is in fluid flow communication to a buffer storage, the first holding line and the first buffer line. The second pump is in fluid flow communication to the buffer storage, the second holding line and the second buffer line. In some embodiments, when the first multi-port valve is in the first position and the second multi-port valve is in the first position, the first pump can provide buffer fluid from the buffer storage to the probe through the first holding line, the first multi-port valve and the second multi-port valve; and when the first multi-port valve is in the second position and the second multi-port valve is in the first position, the second pump can provide buffer fluid from the buffer storage to the probe through second holding line, the first multi-port valve and the second multi-port valve.

Further, the fluid delivery system can comprise a third buffer line and a fourth buffer line. The third buffer line is in fluid flow communication with the first pump and the first multi-port valve such that, when the first multi-port valve is in the first position, the first pump can introduce buffer solution from the buffer storage to the probe through the first multi-port valve. The fourth buffer line is in fluid flow communication with the second pump and the first multi-port valve such that, when the first multi-port valve is in the second position, the second pump can introduce buffer solution from the buffer storage to the probe through the first multi-port valve.

Although the invention has been described with reference to a specific embodiment, the foregoing description is not intended to be construed in a limiting sense. Various modifications as well as alternative applications will be suggested to persons skilled in the art by the foregoing specification and illustrations. It is therefore contemplated that the appended claims will cover any such modifications, applications or embodiments as followed in the true scope of this invention.

That which is claimed is:

1. A process for making fluid delivery in flow-injection based sensing measurements, wherein samples are introduced into a flow cell where sensing measurements are taken, the process comprising:
    (a) loading a first sample from a probe into a first holding line through a first multiport valve;
    (b) injecting the first sample from the first holding line into the flow cell through the first multiport valve and a second multiport valve;
    (c) loading a second sample from the probe into a second holding line through the first multiport valve, wherein said second sample is loaded simultaneously with step (b);
    (d) injecting said second sample from the second holding line into the flow cell through the first multiport valve and second multiport valve;
    (e) loading a third sample from the probe into the first holding line through the first multiport valve, wherein the third sample is loaded simultaneously with step (d);
    (f) continuing the loading and the injecting of samples by alternatively loading samples from the probe into the first holding line and second holding line through the first multiport valve, and by simultaneously loading one sample while another sample is being injected into the flow cell through the first multiport valve and second multiport valve; and
    (g) passing each of the samples through a dispersion loop wherein the dispersion loop forms a gradient in concentration of each of the samples prior to injection of the sample to the flow cell.

2. The process of claim 1, wherein the dispersion loop is situated between the first multiport valve and the second multiport valve.

3. The process of claim 1, further comprising injecting a buffer fluid into the flow cell between injecting samples into the flow cell.

4. The process of claim 3, further comprising injecting the buffer fluid into the first holding line between the loading of samples into the first holding line, and injecting the buffer fluid into the second holding line between the loading of samples into the second holding line.

5. The process of claim 4, further comprising passing buffer fluid from buffer storage through the second valve and then through the probe between injecting samples into the flow cell.

6. The process of claim 5, wherein the second multiport valve has a first position and a second position such that:
    when the second multiport valve is in the first position, the buffer storage is in fluid flow communication with the flow cell such that the buffer fluid can be introduced into the flow cell; and
    when the second multiport valve is in the second position, one of the samples from the first holding line or the second holding line can be introduced through the first multiport valve and the second multiport valve into the flow cell.

7. The process of claim 6, wherein the dispersion loop is situated between the first multiport valve and the second multiport valve.

8. A process for fluid delivery in flow-injection based sensing measurements, wherein samples are extracted from a sample rack by a probe and then are introduced into a flow cell where sensing measurements are taken, the process comprising:
    (a) providing at least two holding lines where each holding line can retain one of the samples prior to injection of the thus retained sample into a flow cell;
    (b) introducing the samples from the probe to the holding lines;
    (c) injecting the samples from the holding lines to the flow cell;
    (d) controlling fluid flow among the holding lines, the probe, the flow cell, and a buffer fluid source by a first multiport valve and a second multiport valve such that:
        (I) the introduction of the samples from the probe to the holding lines and the injection of the samples from the holding lines to the flow cell are alternated such that one holding line is loaded with one of the samples simultaneously with another sample being injected from another holding line to the flow cell; and
        (II) between alternations as provided in (I), buffer fluid is introduced from a buffer fluid source into the flow cell and buffer fluid is introduced from the buffer fluid source into the probe.

9. The process of claim 8, wherein:
    the introduction of the samples from the probe to the holding lines is through the first multiport valve;
    the injection of introducing the samples from the holding line to the flow cell is through the first multiport valve and the second multiport valve.

10. The process of claim 9, wherein the samples pass through a dispersion loop situated between the first multiport valve and the second multiport valve, and the dispersion loop forms a gradient in concentration of the sample prior to injection of the sample to the flow cell.

11. The process of claim 9, wherein:

there are no more than two holding lines;

the first multiport valve has a first position and a second position such that:

when the first multiport valve is in the first position, a first holding line is in fluid flow communication with the second multiport valve and a second holding line is in fluid flow communication with the probe; and when the first multiport valve is in the second position, the first holding line is in fluid flow communication with the probe and the second holding line is in fluid flow communication with the second multiport valve; and the second multiport valve has a first position and a second position such that:

when the second multiport valve is in the first position, the buffer fluid source is in fluid flow communication with the flow cell and the probe such that buffer fluid can be introduced into the flow cell and the buffer fluid can introduced into the probe; and when the second multiport valve is in the second position, one of the samples from one of the holding lines can be introduced from the first multiport valve to the flow cell through the second multiport valve.

12. The process of claim 11 having the following steps:

(i) placing the first multiport valve in the second position;

(ii) introducing one of the samples from the sample racks to the first holding line through the probe and the first multiport valve;

(iii) placing the first multiport valve in the first position and the second multiport valve in the second position;

(iv) after step (iii) introducing the sample from the first holding line to the flow cell through the first multiport valve and the second multiport valve while simultaneously introducing another of the samples from the sample racks to the second holding line through the probe and the first multiport valve;

(v) placing the second multiport valve in the first position;

(vi) subsequent to step (iv), introducing the buffer fluid from the buffer fluid storage to the wash station through the first multiport valve and the probe;

(vii) subsequent to step (v), introducing the buffer fluid from the buffer fluid storage to a wash station through the second multiport valve and the flow cell;

(viii) subsequent to step (vii), placing the first multiport valve in the second position and the second multiport valve in the second position;

(ix) subsequent to step (viii), introducing the sample from the second holding line to the flow cell through the first multiport valve and the second multiport valve while simultaneously introducing another of the samples from the sample racks to the first holding line through the probe and the first multiport valve;

(x) placing the second multiport valve in the first position;

(xi) subsequent to step (ix), introducing the buffer fluid from the buffer fluid storage to the wash station through the first multiport valve and the probe; and (xii) subsequent to step (x), introducing the buffer fluid from the buffer fluid storage to a wash station through the second multiport valve and the flow cell.

13. The process of claim 12, further comprising repeating steps (i) through (xii) until a predetermined number of the samples in the sample racks have been introduced into the flow cell.

14. A process for fluid delivery in flow-injection based sensing measurements, wherein samples from a sample rack are introduced into a flow cell where sensing measurements are taken, the process comprising:

(a) extracting the samples from the sample racks by a probe;

(b) providing at least two holding lines where each holding line can retain one of the samples prior to injection of the thus retained sample into a flow cell;

(b) alternating between the holding lines the introduction of the samples from the probe to the holding lines, wherein the introductions is through a first multiport valve;

(c) alternating the injection of the samples from the holding lines to the flow cell, wherein one holding line is loaded with one of the samples simultaneously with another sample being injected from another holding line to the flow cell, and wherein the injection of the samples is through the first multiport valve and the second multiport valve;

wherein there are no more than two holding lines, and the first multiport valve has a first position and a second position such that:

when the first multiport valve is in the first position, a first holding line is in fluid flow communication with the second multiport valve and a second holding line is in fluid flow communication with the probe; and when the first multiport valve is in the second position, the first holding line is in fluid flow communication with the probe and the second holding line is in fluid flow communication with the second multiport valve; and the second multiport valve has a first position and a second position such that:

when the second multiport valve is in the first position, a buffer fluid can be introduced into the flow cell; and when the second multiport valve is in the second position, one of the samples from one of the holding lines can be introduced from the first multiport valve to the flow cell through the second multiport valve, and wherein the following steps are carried out:

(i) placing the first multiport valve in the second position;

(ii) introducing one of the samples from the sample racks to the first holding line through the probe and the first multiport valve;

(iii) placing the first multiport valve in the first position and the second multiport valve in the second position;

(iv) after step (iii) introducing the sample from the first holding line to the flow cell through the first multiport valve and the second multiport valve while simultaneously introducing another of the samples from the sample racks to the second holding line through the probe and the first multiport valve;

(v) placing the second multiport valve in the first position;

(vi) subsequent to step (iv), introducing the buffer fluid from the buffer fluid storage to the wash station through the first multiport valve and the probe;

(vii) subsequent to step (v), introducing the buffer fluid from the buffer fluid storage to a wash station through the second multiport valve and the flow cell;

(viii) subsequent to step (vii), placing the first multiport valve in the second position and the second multiport valve in the second position;

(ix) subsequent to step (viii), introducing the sample from the second holding line to the flow cell through the first multiport valve and the second multiport valve while simultaneously introducing another of the samples from the sample racks to the first holding line through the probe and the first multiport valve;

(x) placing the second multiport valve in the first position;
(xi) subsequent to step (ix), introducing the buffer fluid from the buffer fluid storage to the wash station through the first multiport valve and the probe; and
(xii) subsequent to step (x), introducing the buffer fluid from the buffer fluid storage to a wash station through the second multiport valve and the flow cell.

15. The process of claim 14, wherein the samples pass through a dispersion loop situated between the first multiport valve and the second multiport valve, and the dispersion loop forms a gradient in concentration of the sample prior to injection of the sample to the flow cell.

16. The process of claim 15, further comprising repeating steps (i) through (xii) until a predetermined number of the samples in the sample racks have been introduced into the flow cell.

* * * * *